Figure 1:
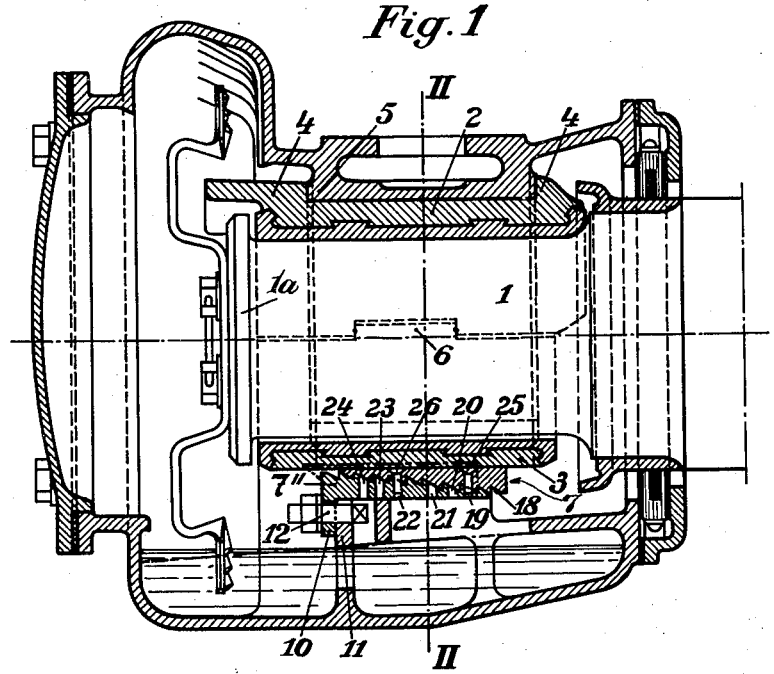

Oct. 9, 1934.  V. A. BARY  1,976,537

AXLE BEARING

Filed May 10, 1930

Inventor
Victor Alexander Bary

Patented Oct. 9, 1934

1,976,537

UNITED STATES PATENT OFFICE 1,976,537

AXLE BEARING

Victor Alexander Bary, London, England

Application May 10, 1930, Serial No. 451,398
In Great Britain May 14, 1929

10 Claims. (Cl. 308—40)

The arrangement of closed, one piece axle brasses or steps on axle journals having removable collars in one piece axle boxes is known; this arrangement possesses the advantages which are necessarily associated with a closed axle brass, namely smooth and certain running of the brass on the journal, so that it is pre-eminently suitable for use in axle boxes on passenger vehicles. The arrangement has however the disadvantage that the collar must be removable in order to be able to fit the closed, one piece tubular brass on to the journal. Owing to this necessity the possibility of fitting one piece, closed brasses on all journals with fixed collars is in the first place excluded. Further, the necessity for arranging a removable journal collar leads to a complicated construction of the bearing owing to the necessary fastening of the collar to the journal. Finally a journal having a removable collar is less reliable than a journal with a fixed collar because the arrangements for effecting the removability of and the securing devices for the removable collar necessarily cause certain weaknesses in the cross-section of the journal carrying the collar. The present invention enables all the advantages of closed bearing brasses to be obtained without carrying with it the disadvantages of the known constructions. The invention solves the problem by dividing the closed axle brass and by providing means for securely holding the brasses in position in the axle box. Divided axle brasses are known per se in the ordinary stationary shaft bearings; in these, however, the one piece construction of the body of the bearing, which is necessary in the case of axle boxes for rail vehicles, is absent, so that the problem underlying these known arrangements was considerably simpler and could be solved by relatively simple means; the lower brass was simply placed in the body of the bearing and the upper brass in the cover of the bearing. In order to be able to fit a closed, divided axle brass on the journal in an undivided axle box, in accordance with the invention, further developments were necessary in the practical execution of the invention. In the first place the closed axle brass must be secured against axial displacement. In carrying out the invention this security is obtained for the upper brass by stops on the same which abut against the axle box, while the securing of the lower brass is effected through the agency of the upper brass namely by means of stops or abutment surfaces between the two brasses which have the effect of preventing displacement in an axial direction. However, in order that, in spite of the presence of these stops on the upper brass, the latter or the axle box might be brought into the final position, special measures had to be provided.

According to the invention, the stops on the upper brass for preventing displacement in the axial direction are of segmentlike shape and the axle box has an opening in the part which encloses the axle brass which corresponds to these segmental stops. In this case the upper and lower brasses are first fitted on the journal and the axle box is then inserted in an axial direction on the journal and the upper and lower brasses in a position in which the opening in the axle box is in front of the segmental stop; after the axle box has been placed on the journal and the upper and lower brasses it is brought into its final position, in which the stop on the upper brass lies in a position opposite to the opening, by turning it round, so that it exercises its allotted function of securing the axle brass against axial displacement in the axle box; the lower brass is in this way also secured against axial displacement in the axle box through the agency of the stops or abutment surfaces between the two brasses which take effect so as to prevent axial displacement. What has been said regarding the stops on the upper brass, naturally holds good when the stops are arranged on the axle box; in this case the brass is provided with corresponding openings or recesses.

Preferably a fitting piece is arranged below the lower brass in the space in the axle box and transmits the vertical shocks from the lower brass directly to the axle box. Since the said space must itself be present in order to enable the parts of the axle brass to be inserted and removed, the arrangement of the member for securing the axle brass against rotation, therefore does not cause any further weakening or aperturing of the axle box than is necessary for other reasons. The fitting piece is preferably received between the lower brass and the axle box by sliding it in and is fixed to the axle box in its end position, for example by means of a flange, a rib on the axle box and a square headed bolt. By this means the axle brass is relieved from all shocks. The lateral shocks are transmitted directly to the axle box through the lateral fitting surfaces, while the vertical shocks according to their direction, are transmitted through the upper brass to the axle box or through the lower brass and the fitting piece to the same.

Figure 2:
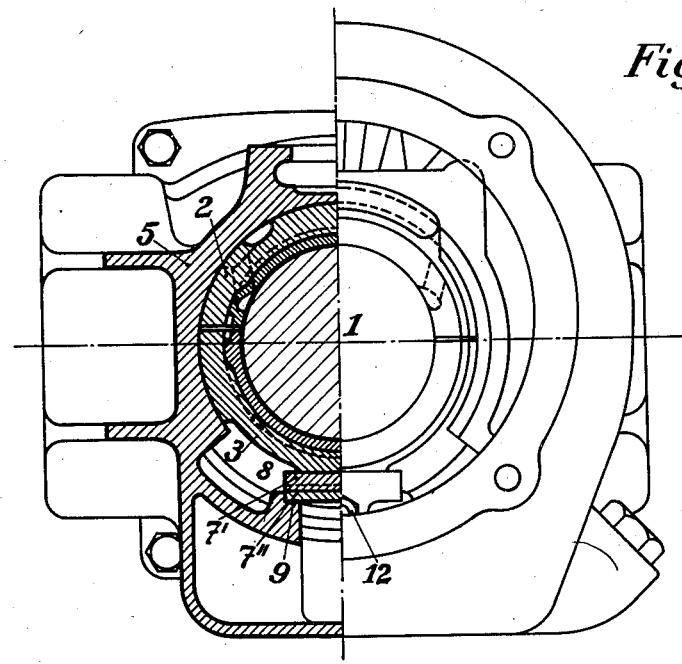

A constructional embodiment of the invention is illustrated by way of example in the accompanying drawing, in which Fig. 1 shows in a longitudinal section a construction in accordance with the invention;

Fig. 2 shows on its left hand side a cross section on the line II—II of Fig. 1. The right hand half of Fig. 2 is a front elevation of the axle bearing.

Referring to the drawing, in both figures 1 represents the axle journal, 2 the upper brass and 3 the lower brass. The upper brass is secured against displacement in the axial direction by means of stops 4 which abut directly against the axle box 5 and transmit the axial shocks thereto. The lower brass is provided with rib like projections 6 which engage in the upper brass and it is secured against displacement in the axial direction by means of these projections indirectly through the upper brass. As described more fully in my copending application Ser. No. 451,399, filed May 10, 1930, the lower brass 3 may be constructed as a lubricating brass, such brass having a smooth, unbroken surface and being held against the journal with little play, so that a lubricating film can be formed between the brass and the journal. It is therefore possible to support the lower brass in an advantageous manner at its lowest point as there are no bore holes or grooves to convey back the lubricant to the lubricant receptacle. For this purpose a fitting piece 7 is used, which at the same time secures the brasses 2, 3 against rotation in the axle box. The fitting piece 7 is arranged inside the space 8 and is received in the axle box 5 by sliding it in at 9 and is fixed to the axle box in its end position by means of a flange 10, a rib 11 on the axle box and the square headed bolt 12. Thus, in accordance with the invention securing members, which weaken the axle brass and the axle box and pierce the latter, are no longer necessary.

The segmental space 8 in which the fitting piece 7 is located is provided primarily to enable the upper brass to be inserted upon or removed from the journal. The arrangement is such that the axle box cannot be lifted sufficiently to enable the right-hand abutment 4 to clear the axle box wall which it engages, and the upper brass to clear the fixed collar 1a. To remove the brass 4, therefore, the box is lifted by the very small distance required to take the load off the brass; the brass is then rotated for about 180° (the fitting piece 7 and the lower brass having been removed) and is withdrawn in inverted position through the opening 8. During assembly, the upper brass is inserted in inverted position and is then rotated on the journal into its operative position.

In accordance with the invention and in order to secure this necessary adjustment, the fitting piece 7 consists of two parts 7' and 7'' which are in connection along an inclined partition surface. The inclined partition surface is provided with indentations 18. Whereas in Fig. 1 the full lines show the position of the parts 7' and 7'' corresponding to the least thickness of the fitting piece, the dotted lines show a position which the fitting piece assumes on displacing the two parts relatively by one indentation when the distance between the lower surface of the lower brass and the ribs 11 is greater. Thus the thickness of the fitting piece increases by an amount depending on the inclination of the partition surface and the distance displaced. The separate parts 7' and 7'' of the fitting piece are also provided with holes 19, 20, 21 and 22, 23, 24 respectively arranged transversely to the partition surface the distance apart of which is so chosen that the possible play between the axle brass and the part 7' before the next alteration in the thickness of the fitting piece does not exceed a pre-determined value. The relative position in which the parts 7' and 7'' have been set can be maintained by means of the bolts 25 and 26. By means of the inclination of the partition surfaces and by arranging a suitable number of indentations 18 it becomes possible to make a sufficiently fine adjustment in the thickness of the fitting piece.

In order to allow the superfluous lubricant not used for the formation of the lubricating film to flow back to the lubricant receptacle, the end of the lower brass opposite to the axle collar is set back with respect to the upper brass.

I claim:

1. An axle bearing suitable for railway vehicles, comprising, in combination, an axle journal having a fixed collar thereon, a bearing brass composed of at least two parts arranged around said journal and substantially completely encircling the same, a one-piece axle box for said axle journal and the bearing brass, means connecting the brass with the box and arranged to transmit shocks on the brass to the box, and abutments on at least one part of the brass extending radially outward and arranged to interengage with the box to hold the brass against axial displacement in both directions, means on another brass part for securing it with respect to the first mentioned brass part, said box having cylindrical walls engaging said brasses and terminating short of the bottom of the box to provide a segmental opening through which said abutments pass, after rotation of the brass through approximately 180° from its operative position in the bearing, upon insertion or removal of the brass.

2. An axle bearing suitable for railway vehicles, comprising, in combination, an axle journal having a fixed collar thereon, a bearing brass composed of at least two parts arranged around said journal, and substantially completely encircling the same, a one-piece axle box, arcuate abutments on one of said bearing brass parts extending radially outward and arranged to engage cooperating portions of the axle box wall to secure such brass against axial displacement, means connecting the brass with the box and arranged to transmit shocks on the brass to the box, and means for securing the other bearing brass part or parts against axial displacement in said axle box, said box having cylindrical walls engaging said brasses and terminating short of the bottom of the box to provide a segmental opening through which said abutments pass, after rotation of the brass through approximately 180° from its operative position in the bearing, upon insertion or removal of the brass.

3. An axle bearing suitable for railway vehicles, comprising, in combination, an axle journal having a fixed collar thereon, bearing brasses composed of at least two parts arranged around said journal and substantially completely encircling the same, a one-piece axle box, arcuate abutments on one of the bearing brasses arranged to engage cooperating portions of the axle box to secure such brass against axial displacement, cooperating projections and recesses on said brass parts effective to prevent relative axial movement therebetween, said axle box having a sector-like aperture through which said brasses are inserted and removed and having hollow cylindrical walls engaging the brasses up to said aperture.

4. Journal bearing according to claim 1, including means operative to secure the bearing brasses against rotation in the axle box.

5. Journal bearing according to claim 1 including a filler piece between the lower brass and the axle box and engaging the bottom of the lower brass and operative to secure the brasses against rotation in the box.

6. Journal bearing according to claim 1, including a filler piece between a brass and the axle box operative to secure the brasses against rotation in the box, said filler piece arranged in the aperture between a brass and the axle box and adapted to transmit shocks received by the brass directly to the box.

7. Journal bearing as set forth in claim 1, including a filler piece between a brass and the axle box operative to secure the brasses against rotation in the box, said filler piece capable of being slid into the axle box and secured to such box.

8. Journal bearing according to claim 1, wherein a lower brass is set back with respect to an upper brass, said displacement adapted to permit return of the oil.

9. An axle bearing suitable for railway vehicles, comprising, in combination, an axle journal having a fixed collar thereon, a bearing brass for said journal composed of at least two parts, a one-piece axle box for said journal and brass parts, means connecting the brass with the box and arranged to transmit shocks on the brass parts to the box, and abutments on at least one of the brass parts extending radially outward and arranged to interengage with the box to hold the brass against axial displacement in both directions, means for securing the parts of the brass with respect to each other, said box having cylindrical walls engaging said brasses and terminating short of the bottom of the box to provide a segmental opening through which said abutments pass, after rotation of the brass position in the bearing, upon insertion or removal through approximately 180° from its operative of the brass.

10. An axle bearing suitable for railway vehicles, comprising in combination, an axle journal having a fixed, non-removable collar thereon, a bearing brass for said journal, said bearing brass being composed of at least two parts, a one-piece axle box housing said journal and brass, the flanks of the brass being in engagement with the box and arranged to transmit shocks on the brass to the box, abutments upon the upper part of the brass extending radially outward, the inner wall of the box extending radially inwardly upon the side of the abutments and inter-engaging with such abutments to hold the brass against axial displacement, and means cooperating with the journal to limit the extent to which the axle box can be shifted radially with respect to the journal and brass to an amount insufficient to enable the abutment on the brass to become disengaged from the box, said box having an opening in the lower region thereof sufficiently large to accommodate the abutments on said brass part, after rotation of the brass through approximately 180° from its operative position in the bearing, so that said brass may be slid in inverted position into and out of the box during assembly or disassembly, respectively, of the bearing.

VICTOR ALEXANDER BARY.